(12) United States Patent
Larson et al.

(10) Patent No.: US 10,899,192 B2
(45) Date of Patent: *Jan. 26, 2021

(54) TRACTOR TRAILER REFRIGERATION UNIT

(71) Applicant: eNow, Inc., Warwick, RI (US)

(72) Inventors: Gerald Larson, Warwick, RI (US); Jeffrey C. Flath, Warwick, RI (US); Robert W. Doane, Harwich, MA (US); Philip R. Pierce, Fernandina Beach, FL (US); Stephen Lasher, Warwick, RI (US)

(73) Assignee: eNow, Inc., Warwick, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/432,053

(22) Filed: Feb. 14, 2017

(65) Prior Publication Data

US 2017/0217280 A1 Aug. 3, 2017

Related U.S. Application Data

(63) Continuation of application No. 14/635,270, filed on Mar. 2, 2015, now Pat. No. 9,586,458.

(60) Provisional application No. 61/946,036, filed on Feb. 28, 2014.

(51) Int. Cl.
*B60H 1/00* (2006.01)
(52) U.S. Cl.
CPC ..... *B60H 1/00428* (2013.01); *B60H 1/00014* (2013.01); *B60H 1/00364* (2013.01); *B60H 1/00764* (2013.01); *Y02T 10/88* (2013.01)

(58) Field of Classification Search
CPC ............ B60H 1/00014; B60H 1/00364; B60H 1/00428; B60H 1/00764; Y02T 10/88
USPC ................ 322/28; 62/115, 236, 243; 700/22
See application file for complete search history.

(56) References Cited

U.S. PATENT DOCUMENTS

| | | | | |
|---|---|---|---|---|
| 3,218,821 A | * | 11/1965 | Spatt | B60H 1/00371 62/239 |
| 5,129,235 A | * | 7/1992 | Renken | B60H 1/3232 454/90 |
| 5,680,907 A | * | 10/1997 | Weihe | B60K 6/48 180/15 |
| 6,157,175 A | | 12/2000 | Morinigo et al. | |
| 6,223,546 B1 | | 5/2001 | Chopko et al. | |

(Continued)

*Primary Examiner* — Pedro J Cuevas
(74) *Attorney, Agent, or Firm* — Armis IP Law, LLC

(57) ABSTRACT

A reefer truck power unit employs a plurality of power sources including: a propulsion vehicle source driven mechanically by a diesel engine of the vehicle, and having an enhanced alternator configured for generation in excess of needs of a charging/starting system of the vehicle, in which the enhanced alternator has a pulley ratio increasing idle speed generation, and a passive vehicle source including a bank of solar panels disposed on the vehicle. The refrigeration system is configured for refrigerating a payload area of the vehicle utilizing power from the power sources, and employs a voltage converter for augmenting the power from the propulsion vehicle source for use with a native vehicle charging/starting system, and a transport load transformer for converting power from the power sources to 3 phase power for powering the refrigeration system. A bank of batteries stores power from the sources for subsequent dispersal to the refrigeration unit.

24 Claims, 4 Drawing Sheets

(56) References Cited

U.S. PATENT DOCUMENTS

| | | | | |
|---|---|---|---|---|
| 6,227,002 B1* | 5/2001 | Bianco | ................... | A23L 3/364 |
| | | | | 62/239 |
| 6,321,550 B1 | 11/2001 | Chopko et al. | | |
| 6,700,214 B2 | 3/2004 | Ulinski et al. | | |
| 7,151,326 B2 | 12/2006 | Jordan | | |
| 7,338,335 B1 | 3/2008 | Messano | | |
| 7,490,684 B2* | 2/2009 | Seymour | ................ | B60L 53/80 |
| | | | | 180/65.1 |
| 8,004,242 B1* | 8/2011 | Purkey | ................... | H02J 7/342 |
| | | | | 320/132 |
| 8,295,950 B1 | 10/2012 | Wordsworth et al. | | |
| 8,536,834 B2 | 9/2013 | Fink et al. | | |
| 8,556,321 B2 | 10/2013 | Johnson et al. | | |
| 8,692,398 B2 | 4/2014 | Neddermeyer et al. | | |
| 8,720,618 B1 | 5/2014 | Cohen | | |
| 8,789,381 B2* | 7/2014 | Awwad | ................... | F25B 27/00 |
| | | | | 62/115 |
| 8,800,307 B2 | 8/2014 | Thogersen et al. | | |
| 8,827,017 B2* | 9/2014 | Neddermeyer, III | ...... | B60P 3/20 |
| | | | | 180/65.285 |
| 8,911,703 B2 | 12/2014 | McAlister | | |
| 8,935,933 B1 | 1/2015 | Koelsch | | |
| 8,955,624 B2 | 2/2015 | Cohen | | |
| 9,321,352 B2* | 4/2016 | Pierce | ................ | B60L 1/02 |
| 9,415,660 B2* | 8/2016 | Koelsch | ............ | B60H 1/00264 |
| 9,586,458 B2* | 3/2017 | Larson | ............... | B60H 1/00014 |
| 9,610,824 B2* | 4/2017 | Allen | ................... | B60H 1/00428 |
| 9,707,844 B2* | 7/2017 | Arnold | ................... | B60K 25/08 |
| 9,937,819 B2* | 4/2018 | Healy | ................ | B60K 17/356 |
| 9,948,136 B2* | 4/2018 | Doane | ................... | H02J 7/0022 |
| 10,053,035 B1* | 8/2018 | Dixon | ................... | B60L 58/20 |
| 10,118,505 B2* | 11/2018 | Healy | ................... | B60L 50/50 |
| 10,245,972 B2* | 4/2019 | Healy | ................... | B60L 53/53 |
| 10,300,871 B2* | 5/2019 | Dixon | ................... | B60L 58/12 |
| 10,384,560 B2* | 8/2019 | Healy | ................... | B60L 50/60 |
| 10,389,121 B1* | 8/2019 | Sherry | ................... | H02S 10/12 |
| 10,549,647 B2* | 2/2020 | Healy | ................... | B60L 7/10 |
| 10,596,913 B2* | 3/2020 | Healy | ................... | B60L 53/00 |
| 10,618,481 B2* | 4/2020 | Dixon | ................... | B60L 1/00 |
| 10,654,369 B2* | 5/2020 | Healy | ................ | B60L 15/2018 |
| 10,766,478 B2* | 9/2020 | Healy | ................... | B60L 58/24 |
| 2002/0014329 A1* | 2/2002 | Carr | ................... | B60H 1/005 |
| | | | | 165/201 |
| 2008/0047766 A1* | 2/2008 | Seymour | ................ | B62B 9/00 |
| | | | | 180/65.1 |
| 2008/0170914 A1* | 7/2008 | Rutherford | ............ | B60K 17/28 |
| | | | | 406/42 |
| 2009/0056354 A1 | 3/2009 | Davis et al. | | |
| 2010/0171364 A1* | 7/2010 | Awwad | ................ | B60H 1/3226 |
| | | | | 307/9.1 |
| 2011/0025126 A1* | 2/2011 | Brabec | ................... | B60L 53/57 |
| | | | | 307/9.1 |
| 2011/0221573 A1 | 9/2011 | Huat | | |
| 2011/0316298 A1* | 12/2011 | Rampersad | ............. | G09F 21/14 |
| | | | | 296/21 |
| 2012/0081067 A1* | 4/2012 | Burrell, IV | ........ | H01R 13/7175 |
| | | | | 320/107 |
| 2014/0025245 A1* | 1/2014 | Fanourakis | ............ | B62D 53/06 |
| | | | | 701/22 |
| 2014/0116077 A1* | 5/2014 | Pierce | ................ | B60L 1/02 |
| | | | | 62/235.1 |
| 2015/0246593 A1* | 9/2015 | Larson | ............... | B60H 1/00014 |
| | | | | 62/56 |
| 2016/0318421 A1* | 11/2016 | Healy | ................... | B62D 59/04 |
| 2017/0217280 A1* | 8/2017 | Larson | ............... | B60H 1/00014 |
| 2018/0233944 A1* | 8/2018 | Doane | ................... | H02J 7/35 |
| 2018/0354437 A1* | 12/2018 | Dixon | ................... | B60R 16/033 |
| 2019/0202429 A1* | 7/2019 | Richter | ................... | B60W 10/06 |
| 2019/0270418 A1* | 9/2019 | Dixon | ................... | B60L 50/50 |
| 2019/0277647 A1* | 9/2019 | Adetola | ............... | B60H 1/00771 |
| 2019/0288350 A1* | 9/2019 | Saroka | ............... | B60H 1/00278 |
| 2020/0238932 A1* | 7/2020 | Dixon | ................... | B60L 1/00 |

* cited by examiner

TRACTOR TRAILER REFRIGERATION UNIT

RELATED APPLICATIONS

This patent application is a continuation under 35 U.S.C. § 120 of U.S. patent application Ser. No. 14/635,270 filed Mar. 2, 2015, entitled "TRACTOR TRAILER REFRIGERATION UNIT," which claims the benefit under 35 U.S.C. § 119(e) of U.S. Provisional Patent Application No. 61/946,036 filed Feb. 28, 2014, entitled "TRACTOR TRAILER REFRIGERATION UNIT," incorporated herein by reference in entirety.

BACKGROUND

Refrigeration trucks provide an effective means of long distance transport for perishable goods. Power requirements for maintaining the perishable load encompass a compressor for circulating refrigerant and a fan for circulation of temperature controlled air. A refrigeration unit may be attached to the front of a class-8 (tractor-trailer) for maintaining controlled temperatures during transport. Often, the refrigeration unit receives power from the tractor while in motion. Typically, the refrigeration unit is powered by a small diesel engine that is integral with the refrigeration system on the trailer. The small engine operates when the truck is in-motion, and from an external utility, or "shore power" source when stationary. Longer transport ranges may require extended periods where the trailer is stationary and without shore power, and modern, evolving "no-idle" laws may limit the effectiveness of idling a tractor motor or invoking a separate generator for of using the small diesel engines for maintaining refrigeration.

SUMMARY

A reefer truck power unit employs a plurality of power sources including a propulsion vehicle source driven mechanically by a diesel engine of the vehicle, and employing an enhanced alternator configured for generation in excess of needs of a charging/starting system of the vehicle, in which the enhanced alternator has a pulley ratio increasing idle speed generation, and a passive vehicle source including a bank of solar panels disposed on the vehicle. The refrigeration system is configured for refrigerating a payload area of the vehicle utilizing power from the power sources, and employs a voltage converter for augmenting the power from the propulsion vehicle source for use with a native vehicle charging/starting system, and a transport load transformer for converting power from the power sources to 3 phase power for powering the refrigeration system. A bank of batteries stores power from the sources for subsequent dispersal to the refrigeration unit.

So-called "reefer" trucks include class 7 and class 8 heavy duty trucks configured with a refrigerated cargo area for transporting perishable and frozen goods. More colloquially referred to as "18 wheelers" and "box" trucks, these vehicles employ a dedicated refrigeration mechanism for cooling a cargo or payload area. Conventional refrigerated loads employ a trailer mounted generator that operates separately from the diesel engine which provides primary vehicle propulsion. In configuration herein, a power source for refrigerated class 8 (tractor trailer) trucks and non-articulated box trucks employs a mechanical linkage from the propulsion vehicle engine, such as a tractor or cab diesel engine, and supplements propulsion vehicle power with a passive vehicle source such as solar panels and a storage element (i.e. battery) for providing continuous refrigeration for a perishable cargo. An enhanced alternator and pulley arrangement, or a PTO (power take-off) linkage represent two configurations for drawing reefer power directly from the propulsion vehicle, rather that requiring a dedicated diesel engine generator apparatus.

The disclosed power control system depicts a method and apparatus for standalone mobile refrigeration that employs a plurality of power options for refrigeration which need not rely on a dedicated combustion-based source provides a tractor trailer or box truck with the capacity to transport perishable loads by leveraging and storing power gathered from passive sources such as solar and incidental sources such as the electrical generation capacity of the native vehicle charging and starting system.

Configurations herein are based, in part, on the observation that conventional refrigeration ("reefer") units for class-8 tractor trailer trucks and non-articulated box trucks often rely on a separate, dedicated generator and diesel engine for providing power to the refrigeration unit (compressor and fan). Unfortunately, conventional approaches suffer from the shortcoming that the addition of a dedicated engine solely for accommodating the refrigeration load increases pollution, cost and maintenance by introducing a separate fossil-fuel based combustion source into the transportation overhead. The modern trend toward "green" business practices identifies diesel engines of freight trucks as a major contributor of pollution. In observing the necessary role played by diesel based transport in the national economy, the Federal Government has mandated provisions to prohibit excessive idling of freight trucks to at least mitigate pollution.

Configurations herein substantially overcome the above-described shortcomings by providing a standalone refrigeration system that does not rely on a standalone diesel generator for powering the refrigeration load. A combination of solar panels, high capacity storage batteries, and an enhanced alternator to retrofit the native vehicle alternator powers a refrigeration system without an additional combustion source.

A propulsion vehicle source such as a high capacity alternator derives power from the routine rotation of the diesel engine. A passive vehicle source such as solar panels combines with the propulsion vehicle power for supporting a vehicle based load such as the reefer, and a storage element such as high capacity bank of batteries stores excess power to provide electrical inertia and "smooth out" variances in the alternator and solar sources. Reefer units are often disposed in a dedicated enclosure on the front of the trailer or box truck cargo area. The enclosure houses the compressor, electric motor, condenser and fan of the reefer system. Conventional arrangements typically place the diesel generator in this enclosure, however configurations herein utilize this area below the compressor for a bank of storage batteries, since the diesel generator is not required.

In a particular configuration disclosed below, the alternator is a high capacity 24v alternator, and a native load transformer, such as a 12v DC-DC converter transforms power needed to support the 12v needs of the native vehicle charging and starting system (i.e. vehicle lights, fans, mobile electronics, etc). A transport load transformer such as an inverter couples to the 24v storage element for providing 230v 3-phase power for operating the refrigeration compressor and fans. An interface to an alternate power source, such as shore power, is invokable when the vehicle is parked. The storage element may operate on other than 24v by configuring the batteries, such as disclosed in copending U.S. patent application Ser. No. 13/752,765, filed Jan. 29, 2013, entitled "METHOD AND APPARATUS FOR VEHICULAR ENERGY MANAGEMENT," incorporated herein by reference. Similarly, the reefer unit may operate on electrical power characteristics other than 230-240 vAC 3-phase, and the inverter adjusted to match.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A trailer power supply system for mobile Class-8 tractor-trailer refrigeration provides multiple and stand-alone power options for maintaining refrigeration trailers in an existing footprint commonly used by conventional diesel powered approaches.

Figure 1:
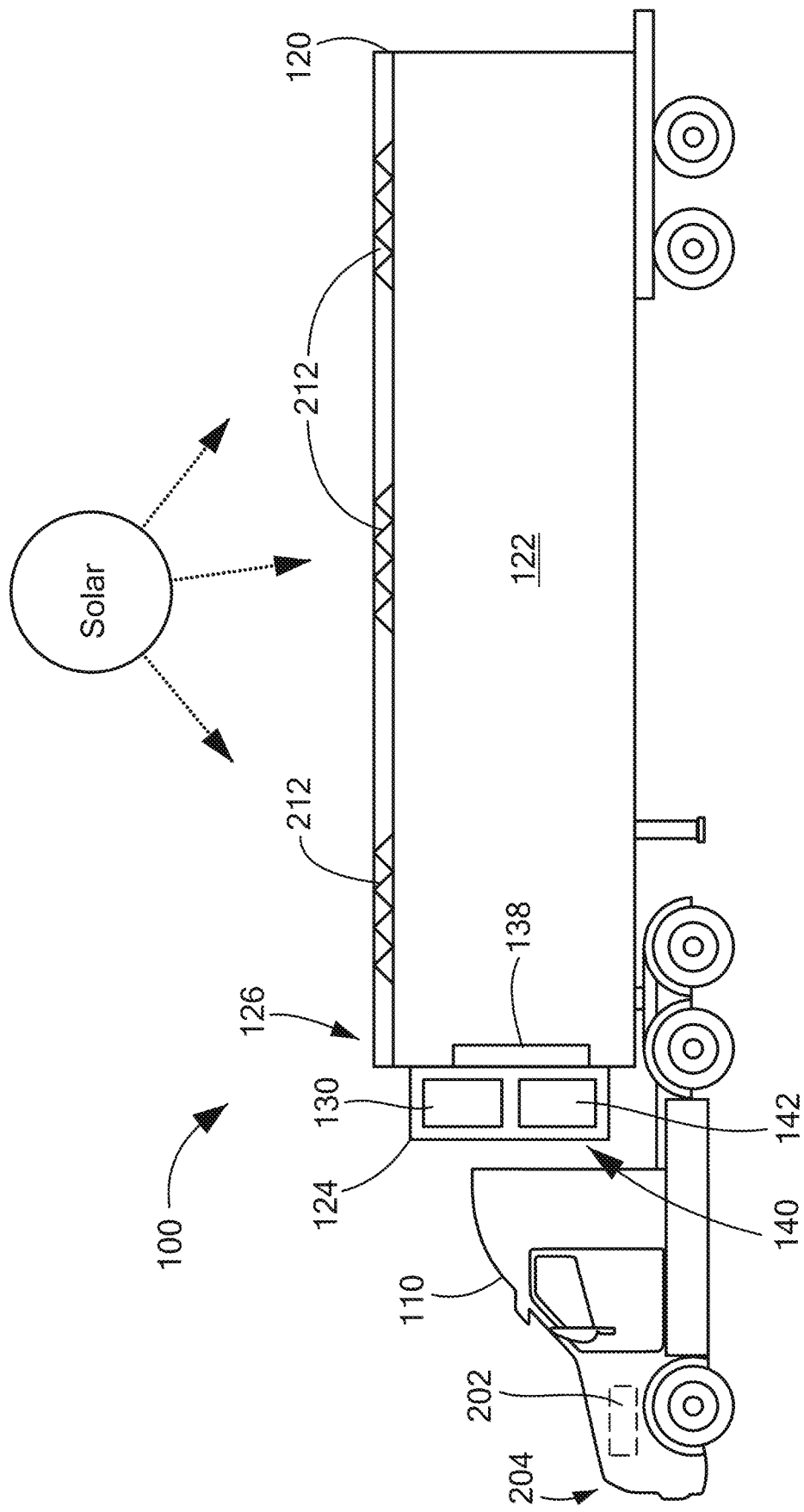
FIG. 1 is a trailer power environment suitable for use with configurations disclosed herein.

FIG. 1 is a trailer power environment suitable 100 for use with configurations disclosed herein. Referring to FIG. 1, a tractor trailer typically includes a propulsion vehicle 110 articulated to a trailer 120. The trailer 120 is substantially a rectangular box shape defining a refrigerated cargo area 122. A rack 124 or similar enclosure on a front end 126 of the trailer supports and houses refrigeration system 130 for cooling the cargo area 122. A non-articulated vehicle, commonly called a "box" truck, may also define the propulsion vehicle 110 and cargo area 122, and usually employs a slightly smaller cargo area. The refrigeration system 130 may be operable for so called medium temperature storage, for transport of perishable foods around 34 degrees F., or low temperature which encompasses frozen foods.

The refrigeration system 130 includes a compressor, electric motor, and condenser, and an evaporator 138 in the cargo area provides heat transfer for cooling the cargo area 122. Battery storage 140 occupies an area on the rack below the refrigeration system, in a region utilized by a diesel generator in conventional approaches.

Figure 2:
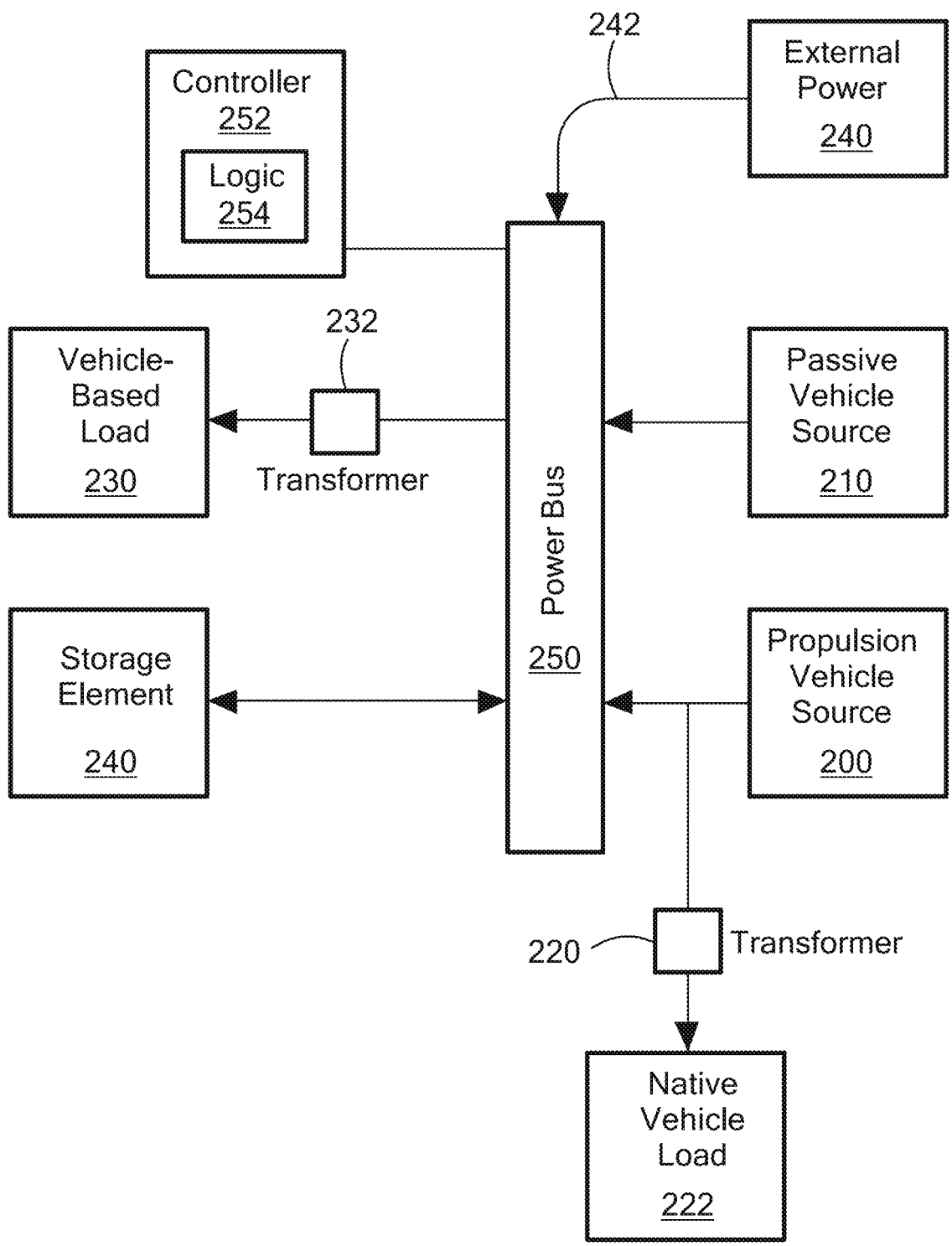
FIG. 2 is a block diagram of the reefer power system disclosed herein.

FIG. 2 is a block diagram of the reefer power system disclosed herein. Referring to FIGS. 1 and 2, a propulsion vehicle source 200 generates power from an enhanced alternator 202 on the diesel engine 204 that provides primary propulsion for the vehicle 110. Alternate configurations may employ a PTO drive, also on the tractor vehicle 110, discussed below.

A native load transformer 220 adjusts electrical characteristic such as voltage to suit the load, typically a 12v environment. A passive vehicle source 210 such as solar panels 212 provides additional power input. Both the propulsion vehicle source 200 and the passive vehicle source 210 aggregate in a power bus 250, for powering a vehicle based load 230 such as the refrigeration system (reefer) 130. A storage element 240 such as a battery or bank of batteries 142 stores excess power not immediately consumed by the vehicle based load 230. A transport load transformer 232, such as an inverter, adjusts electrical characteristics to the reefer 130, which typically operates on 230v 3-phase power. In the example configuration, the power bus 250 carries 24 v power from the enhanced alternator 202 and the solar panels 212, however other voltage characteristics may be employed. An alternate power source 240 such as shore power may be provided via an alternate power interface 242 when the vehicle is stationary.

Figure 3:
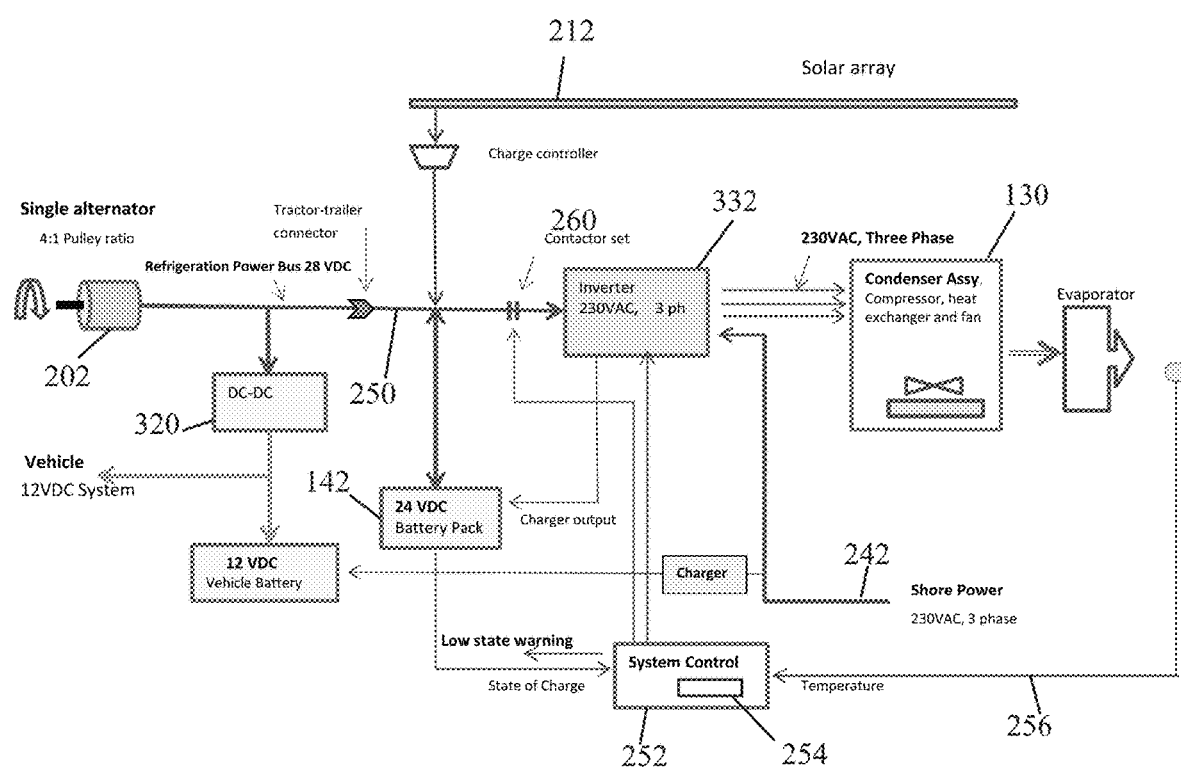
FIG. 3 depicts an enhanced alternator configuration of the power system in FIG. 1.

FIG. 3 depicts an enhanced alternator configuration of the power system in FIG. 1. Referring to FIGS. 1-3, in the self-contained vehicle power system operating in the environment 100, an electrical controller 252 includes control logic 254 for powering the transport vehicle based load 230. The enhanced alternator 202 provides a propulsion vehicle source 200 driven by a native propulsion source, typically the diesel engine 204, of the vehicle. The enhanced alternator 202 replaces the standard 12v OEM (original equipment manufacturer) alternator with a higher capacity 24v 320 amp or similar alternator.

The passive vehicle source 210, such as solar panels 212, are disposed on the roof of the trailer vehicle 120 and are adapted for providing power independently of vehicle motion or engine state. The solar panels 212 provide power at 24v to correspond to the enhanced alternator 202 and batteries 142. Particular configurations dispose the storage element 240 on a forward wall of the cargo area 122 of the vehicle adjacent the refrigeration compressor in a volume typically invoked for storing a generator power source for the refrigeration compressor, such as the rack area 124.

Refrigeration equipment 130 defines the vehicle based load 230 responsive to power from the propulsion vehicle source 200 or the passive vehicle source 210. An interface transformer 220 to a native vehicle load 222, such as a DC-DC converter powers the native vehicle load 222 concurrently with the vehicle based load 230 from the enhanced alternator 202. The bank of batteries 142 define the storage element 240 configured for accumulating excess power for subsequent dispersal to the vehicle based load 230. In this manner, the refrigeration system 130 employs a plurality of power sources, including a propulsion vehicle source driven mechanically by a native propulsion source of the vehicle using an enhanced alternator 202 configured for generation in excess of needs of a charging/starting system of the vehicle. The enhanced alternator has a pulley ratio increasing idle speed generation. Power sources also include a passive vehicle source including a bank of solar panels 212 disposed on the vehicle, such that the refrigeration system configured for refrigerating a payload area 122 of the vehicle utilizing power from the power sources.

The propulsion vehicle source 130, in a particular environment, includes the enhanced alternator 202 for power generation in excess of that produced by a native vehicle charging system, and is expected to be in the range of 24v at 320 amps (amperes). OEM alternators for vehicles in this class are typically on the order of 12v at 160 amps. In order to provide sufficient power at idle engine speeds, the enhanced alternator 202 has a pulley ratio of at least 4:1 for generating converted voltage sufficient for operating a 3 phase, 240v refrigeration load. The engine pulley/serpentine/belt drive arrangement may also modify the enhanced alternator 202 to employ a rotary drive interface configured for operation with belt tensioners on the native vehicle, such that the rotary drive interface is sufficient for operating the refrigeration load at an idle engine speed of the native vehicle. Modification of the pulley size to incorporate a smaller pulley allows higher RPMs, and thus higher wattage (power) to be produced. Pulley size is modified within a range that the additional length on the belt is absorbed by the native vehicle tensioners, and does not require further modification to the belt drive system. In other cases, other pulleys may need to be enlarged, and/or belt tensioners modified to accommodate the smaller pulley.

In a particular arrangement, the enhanced alternator 202 produces a nominal 24 v power signal (typically 28v peak for charging a 24v battery) while the native propulsion vehicle loads operate nominally on 12v, as is typical with vehicular electric and charging/starting systems. The storage element 240 is configured for providing a 24 v power signal adapted for aggregation with the enhanced alternator 202, and is adapted to receive substantially around 28v generated by the alternator 202. The transport load transformer 232 takes the form of an inverter configured for producing substantially 230v AC power from the aggregated 24v power signal adapted for powering the vehicle based load 230, in which the vehicle based load includes a refrigeration compressor and fan.

The passive vehicle source 210 includes a bank of solar panels 212 disposed on a roof of a cargo payload area 122 of the vehicle, such that the storage element 240 is configured for receiving and storing excess power from the solar panels. In a typical operating scenario, running a reefer 130 unit for medium temperature (perishables), the configuration above draws 13.0 Kw with the compressor and fan operating. Note that the compressor need only operate when cooling is called for, and therefore fluctuates with ambient temperature 256. Vehicle demands may place another 1.0 Kw demand. Refrigeration demands, adjusted for compressor cycling, average about 9.1 Kw. Even on a cloudy day, the solar panels provide 1.5 Kw, thus requiring 7.6 Kw (9.1 Kw-1.5 Kw) to operate the reefer 124. With the adjusted pulley and enhanced alternator 202, 7.0 Kw is produced at a 700 rpm idle, resulting in an 8% shortfall that is accommodated by the batteries 142. Idling the engine at 1200 rpm, however, produces 8.4 Kw, and running operation at 1400 rpm provides 8.6 Kw, providing a margin of 70%.

In a particular example configuration as disclosed herein, the above calculations for energy balance include appropriate operation at engine idle, high idle RPM (which may be set with the vehicle J1939 Data Bus), and at highway speeds. The disclosed example configuration is operable for Dedicated Regional Haul Medium Temperature Refrigeration applications where vehicles are loaded, then travel same day directly to delivery locations. With same day operation, drivers do not need to stop for mandatory ten hour rest periods. Medium Temperature Refrigeration is for dairy, fruit, and vegetables where the refrigeration temperature is 35 Degrees F. Alternate configuration will have sufficient power for low temperature refrigeration applications—Frozen products where −10 Deg. F temperatures are typical.

As indicated above, the tractor electrical power generation is modified: The 24 VDC alternator is replaced with a high output 28 VDC alternator and the alternator is equipped with a smaller pulley to enable better power at low engine speeds; the desired pulley ratio is in the 4:1 range. Conventional trucks are sold with lower power output 14 VDC alternators, (typically 160 Amp units). The specified 28 VDC unit is rated for 10 KW power (360 Amps at 28 VDC). The 4:1 pulley ratio would allow use with existing engine accessory belt and tensioners should to provide sufficient "belt wrap" on the alternator pulley without modification belt length or tensioners.

The tractor-trailer power system is low voltage (28 VDC) which is very important to end users since they do not drivers or mechanics to have access to high voltages (UL Class II voltage limit is 60 VDC for low voltage systems). However, tractor-trailer connector current is high, so multi-strand high flexibility, high current cables may be employed.

The addition of the enhanced alternator 202 is accommodated by the vehicle by a converter for transforming the voltage from the enhanced alternator to voltage suitable for the native propulsion vehicle electrical demand. Since the enhanced alternator 202 operates on different voltage characteristics than the native vehicle charging system, the vehicle load transformer 220 is a converter 320 for augmenting the power from the enhanced alternator 202 for powering the vehicle based load 230. The native load transformer 220, in the example configuration, is a 24 v-12v DC-DC converter, to allow normal operation of the OEM vehicle electrical and starting/charging system.

The controller 252 includes control logic 254 for directing power from the propulsion vehicle source 200 and the passive vehicle source 210 to the refrigeration system 130 based on a computed demand of cooling capacity. The control logic engages a contactor set 260 or other switching apparatus for directing power to the inverter 232

Also includes is an alternate power interface 242 adapted to receive external power for supplementing the propulsion vehicle source and the passive vehicle source. Truck stops and other rest and stopping facilities allow an external hook up to maintain reefer power and to "top off" the batteries 142.

Figure 4:
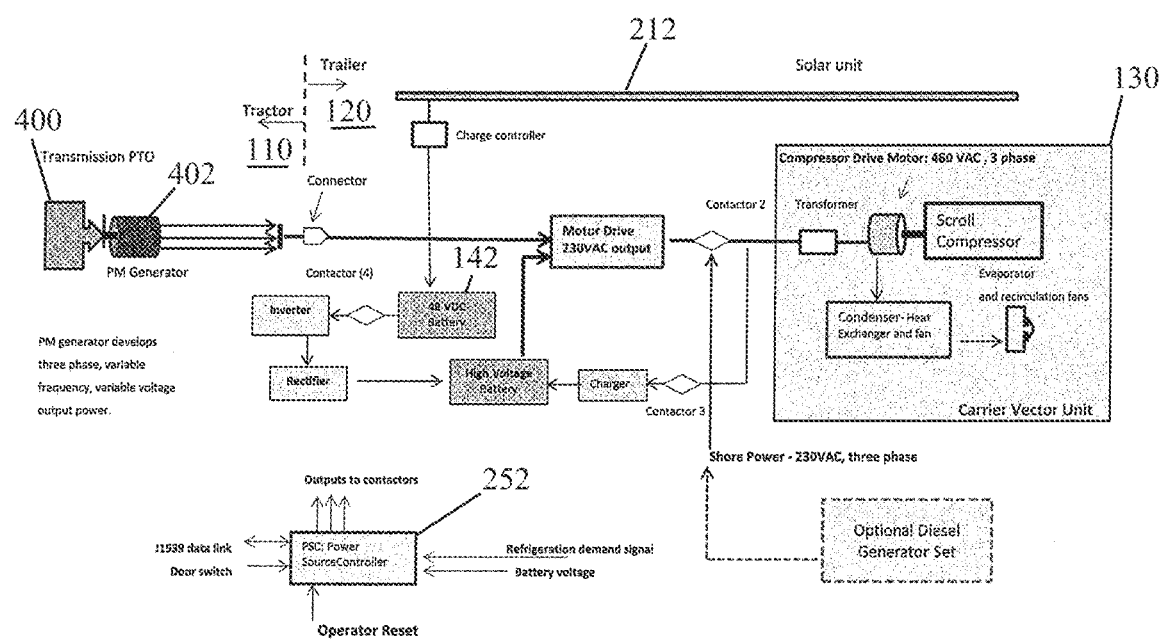
FIG. 4 depicts a PTO configuration of the power system of FIG. 1.

FIG. 4 depicts a PTO configuration of the power system of Fig. The alternate configuration includes a PTO linkage, rather than an alternator connection, such that the propulsion vehicle source 130 further comprises a PTO (power take-off) interface 400 responsive to a tractor for receiving rotational power, and a PM (permanent magnet) generator 402 for producing input power from the rotational power.

Deployment as above involves installing the propulsion vehicle source 130, such as enhanced alternator 202, for enhancing a voltage generation capability of a native vehicle charging and starting system. This involves modifying a pulley ratio for increasing power output of the voltage generation during propulsion vehicle idle. A DC-DC converter provides 12v allowing for converting at least a portion of power from the enhanced voltage generation for powering native propulsion vehicle loads. The batteries 142 store power harvested from a passive power source 210 such as solar panels 212 disposed on the vehicle, as well as excess power from the enhanced alternator 202. Such an approach may be retrofitted or designed into existing space requirements such those of the Carrier® Vector unit or similar refrigeration sources. Typical refrigeration sources include power demands of a scroll compressor and ventilation fan. A power bus 250 and controller 252 combine power from the generated voltage and the stored, harvested power, and the inverter 332 augments the combined power for driving a refrigeration unit on the vehicle, typically via 230v 3-phase power.

Conventional approaches suffer from various shortcomings not present in the novel power gathering and management approach outlined herein. For example, U.S. Pat. No. 6,223,546 shows a trailer mounted compressor unit designed to occupy the "swing area" between the tractor and the trailer. A generating unit adjacent to the vehicle prime mover provides a direct coupling between the compressor electric motor and generator to mitigate exposure to the mechanical linkage driving the compressor. This approach avoids exposure of a mechanical PTO linkage from the truck motor to drive the refrigeration compressor, which typically includes seals and bearings around a rotating shaft that can be prone to wear from environmental exposure. The disclosed approach, by drawing electrical power from the enhanced alternator and solar powered battery, avoids a vulnerable PTO linkage and the addition of a dedicated generator for refrigeration electrical power. Other approaches include operating the compressor in a reduced output mode to correspond to the fluctuations of the speed of the directly coupled shaft, which varies with vehicle speed, as disclosed in U.S. Pat. No. 8,789,381, initially assigned to Carrier Corporation of Syracuse, N.Y. In contrast, Configurations herein employ a pulley of a prescribed size for maintaining idle time speed of the enhanced alternator. Start-up compressor motor voltages, which may often need to overcome head pressure in the compressor, are accommodated by the high capacity storage element (Battery) 142, which gathers solar generation from trailer mounter panels and provides an electrical surge for startup, in contrast to U.S. Pat. No. 6,321,550, which provides a means for unloading compressor pressure at startup.

Other conventional approaches avoid a PTO linkage through the use of a mechanical power transfer system, which effects an additional mechanical linkage for a generator disposed outside of the engine compartment in addition to the vehicle primary generation system (i.e. alternator). Such an approach is depicted in U.S. Pat. Nos. 8,995,624 and 8,720,618, to Aura Systems Inc. Configurations herein, in contrast, do not require a second generator outside of the engine compartment and separate from a PTO linkage, U.S. Pat. No. 6,157,175 monitors the speed of an engine driven generator for modifying a power output signal based on engine speed. The approaches herein employ a pulley size and tensioner arrangement for maintaining generator speeds within acceptable levels. U.S. Pat. No. 6,700,214 employs signaling over a power bus for driving voltage levels to desirable levels.

U.S. Pat. Nos. 8,827,017, 8,692,398 and 8,536,834, to Thermo King Corporation, suggest a mobile environmentally controlled unit monitored for cycling an internal combustion engine powering a compressor for cooling the environmentally controlled unit. In contrast to conventional approaches, some of which are outlined above, the disclosed configurations teach a propulsion vehicle source including an enhanced alternator and a passive vehicle source connected to a storage element for buffering and maintaining consistency in a power level sufficient for powering a vehicle based load such as a refrigerated trailer through cyclic compressor activation.

In further detail, the PTO adaptation shown in FIG. 4 illustrates a hybrid vehicle traction drive system to the trailer power electric refrigeration system. Mechanical power is applied to a high efficiency permanent magnet generator via a PTO drive shaft coupled to the generator. The resulting variable voltage, variable frequency electrical power is transferred to the trailer via a high voltage (shore power) connector. The power from the generator must be converted to useful constant voltage (230 or 460 VAC), constant frequency (60 Hz) motor drive power. This is accomplished with a traction drive (PD300) that has been configured for the constant voltage, constant frequency need. Note: The traction drive package is located on the trailer to avoid space constraints on the tractor.

The generator arrangement therefore includes a PTO (power take-off) interface responsive to a tractor for receiving rotational power, and a PM (permanent magnet) generator for producing input power from the rotational power. The PM generator is configured for providing a variable voltage and variable frequency AC signal based on a rotation speed of the PTO interface, which integrates will with the manual transmission output of the tractor. The drive electronics circuit is responsive to the PM generator for generating an electrical signal to which the refrigeration compressor is responsive, in effect "smoothing" or "filtering" the raw power output from the PTO to provide a suitable AC signal. The PM generator driven by the PTO should also be distinguished from an external diesel generator which may be invoked as an alternate source, if needed (discussed further below).

In the example configuration, the trailer power refrigeration system operates with 460 VAC, three phase, 60 Hz power. However, a 2× step-up transformer is available to enable operation with 230 VAC three phase power. The system as shown employs the step-up transformer to enable operation with the available traction drive.

The electronic control unit is used to determine power sourcing to the refrigeration unit. Shore (utility) power has first priority, PTO generated power has second priority, and power source conflicts are avoided by disabling PTO generated power via an electrical contactor whenever the presence of shore power is sensed. The control unit includes a switch responsive to the drive electronics circuit for identifying an available source of the input power, and connecting the drive electronics circuit to the identified available source. The alternate power interface is responsive to a shore power connection for receiving the input power from an external power connection. Therefore, the alternate power interface is sensed and power drawn appropriately from solar, external, or PTO based sources.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. In a self-contained vehicle power system, an electrical controller device for powering a transport vehicle based load, comprising:
   a propulsion vehicle source driven by a native propulsion source of a vehicle including an enhanced alternator for power generation in excess of that produced by a native vehicle charging system, the enhanced alternator sufficient for operating a refrigeration load at an idle engine speed of the vehicle;
   a passive vehicle source disposed on the vehicle and adapted for providing power independently of vehicle motion or engine state, the passive vehicle source including a bank of solar panels disposed on a roof of a cargo payload area of the vehicle;
   a refrigeration load responsive to electric power from the propulsion vehicle source or the passive vehicle source;
   an interface to a native vehicle load, the interface for powering the native vehicle load concurrently with the refrigeration load;
   a storage element configured for accumulating excess power for subsequent dispersal to the refrigeration load; and
   a starting battery connected to the enhanced alternator for charging from the propulsion vehicle source, the propulsion vehicle source for charging the starting battery and the storage element based on an available power source and refrigeration demand.

2. The device of claim 1 wherein the enhanced alternator has a pulley ratio of at least 4:1 for generating converted voltage sufficient for operating a 3 phase, 240v refrigeration load.

3. The device of claim 2 wherein the enhanced alternator further comprises a rotary drive interface configured for operation with belt tensioners on the vehicle.

4. The device of claim 1 wherein the storage element is configured for receiving and storing excess power from the solar panels.

5. The device of claim 4 wherein the enhanced alternator operates on different voltage characteristics than the native vehicle charging system, further comprising an inverter for augmenting the power from the enhanced alternator for powering the refrigeration load.

6. The device of claim 5 wherein:
the enhanced alternator produces a nominal 24v power signal output and the native propulsion vehicle loads operate nominally on 12v;
the storage element is configured for providing a 24v power signal output adapted for aggregation with the enhanced alternator; and
the inverter is configured for producing substantially 230v AC power from the aggregated 24v power signal adapted for powering the refrigeration load, the refrigeration load including a refrigeration compressor and fan.

7. The device of claim 5 further comprising control logic for directing power from the propulsion vehicle source and the passive vehicle source to the refrigeration load based on an available power source and refrigeration demand.

8. The device of claim 7 further comprising an alternate power interface adapted to receive external power for supplementing the propulsion vehicle source and the passive vehicle source.

9. The device of claim 1 further comprising a converter for transforming the voltage from the enhanced alternator to voltage suitable for the native vehicle electrical demand.

10. The device of claim 1 wherein the propulsion vehicle source further comprises:
a PTO (power take-off) interface responsive to a tractor for receiving rotational power; and
a PM (permanent magnet) generator for producing input power from the rotational power.

11. The device of claim 1 wherein the enhanced alternator has a modified pulley providing a pulley ratio for increasing idle speed power generation.

12. The device of claim 1, wherein a pulley size is modified within a range to where an additional length is absorbed by native vehicle tensioners.

13. The device of claim 12, wherein belt tensioners are modified to accommodate the smaller pulley.

14. The device of claim 1 further comprising control logic for directing inverted AC power to the refrigeration load from the enhanced alternator once the starting battery demand has been satisfied.

15. The device of claim 14 wherein the enhanced alternator provides power to the refrigeration load unencumbered from a need for providing motive force to the vehicle.

16. The device of claim 1 wherein operation of the refrigeration load further comprises an electric motor powering a refrigeration compressor.

17. The device of claim 1 wherein power from the native vehicle charging system resulting from the enhanced alternator is engaged upon an insufficient capacity from the bank of solar panels and insufficient power capacity from the storage element.

18. A method for powering a mobile refrigeration load, comprising:
enhancing a voltage generation capability of a vehicle charging and starting system from an enhanced alternator for power generation in excess of that produced by a native vehicle charging system, the enhanced alternator sufficient for operating an electric refrigeration load at an idle engine speed of the vehicle;
modifying a pulley ratio for increasing a power output of the enhanced alternator towards the enhanced voltage generation during idling of the vehicle;
converting at least a portion of power from the enhanced voltage generation for powering native vehicle loads;
storing, in a storage element, power harvested from a passive power source disposed on the vehicle, the passive power source including a bank of solar panels disposed on a roof of a cargo payload area of the vehicle;
combining power from the generated voltage and the stored, harvested power;
inverting the combined power for driving a refrigeration load on the vehicle; and
directing at least some of the power output to a starting battery connected to the enhanced alternator, the starting battery responsive for charging from the voltage generation capability of the vehicle source, the voltage generation capability for charging the starting battery and the storage element based on an available power source and refrigeration demand.

19. The method of claim 18 further comprising disposing the storage element on a forward wall of the cargo area of the vehicle adjacent the refrigeration compressor in a volume typically invoked for storing a generator power source for the refrigeration compressor.

20. The method of claim 18 wherein the enhanced alternator further comprises a comprises a rotary drive interface configured for operation with belt tensioners on the vehicle, the rotary drive interface sufficient for operating the refrigeration load at an idle engine speed of the vehicle.

21. The method of claim 18 wherein the passive vehicle source includes a bank of solar panels disposed on a roof of a cargo payload area of the vehicle, the storage element configured for receiving and storing excess power from the solar panels.

22. The method of claim 18 wherein:
the enhanced alternator operates on different voltage characteristics than the native vehicle charging system, further comprising an inverter for augmenting the power from the enhanced alternator for powering the refrigeration load;
the enhanced alternator produces a nominal 24v power output and the native propulsion vehicle loads operate nominally on 12v;
the storage element is configured for providing a 24v power output adapted for aggregation with the enhanced alternator; and
the inverter is configured for producing substantially 230v AC power from the aggregated 24v power signal adapted for powering the refrigeration load, the refrigeration load including a refrigeration compressor and fan.

23. In a self-contained vehicle power system, a system for powering a transport based load, comprising:
a plurality of power sources including:

a propulsion vehicle source driven mechanically by a native propulsion source of the vehicle including an enhanced alternator configured for generation in excess of needs of a charging/starting system of the vehicle, the enhanced alternator having a pulley ratio increasing idle speed generation sufficient for operating an electric refrigeration load at an idle engine speed of a native vehicle; and a passive vehicle source including a bank of solar panels disposed on a roof of a cargo payload area of the vehicle;

a refrigeration system defining a refrigeration load configured for refrigerating a payload area of the vehicle utilizing power from the power sources;

a voltage converter for augmenting the power from the propulsion vehicle source for use with a native vehicle charging/starting system;

a transport load transformer for converting power from the power sources to 3 phase power for powering the refrigeration system;

a storage element for storing power from the sources for subsequent dispersal to the refrigeration load;

a starting battery connected to the enhanced alternator and responsive for charging from the propulsion vehicle source, the propulsion vehicle source for charging the starting battery and the storage element based on a computed demand of cooling capacity; and control logic for directing the power from the sources to the storage element and the refrigeration system based on available power source and refrigeration demands.

24. The system of claim 23 wherein the storage element is configured for delivering power sufficient for overcoming a head pressure in a compressor defining at least a portion of the transport load.

* * * * *